(12) United States Patent
Lee

(10) Patent No.: US 10,823,613 B2
(45) Date of Patent: Nov. 3, 2020

(54) LEAKY WAVEGUIDE, SPECTROSCOPIC METHOD, AND SPECTROSCOPE INCLUDING THE LEAKY WAVEGUIDE

(71) Applicant: SAMSUNG ELECTRONICS CO., LTD., Suwon-si (KR)

(72) Inventor: Jaesoong Lee, Suwon-si (KR)

(73) Assignee: SAMSUNG ELECTRONICS CO., LTD., Suwon-si (KR)

(\*) Notice: Subject to any disclaimer, the term of this patent is extended or adjusted under 35 U.S.C. 154(b) by 75 days.

(21) Appl. No.: 16/003,896

(22) Filed: Jun. 8, 2018

(65) Prior Publication Data

US 2019/0178713 A1   Jun. 13, 2019

(30) Foreign Application Priority Data

Dec. 8, 2017   (KR) .................. 10-2017-0168480

(51) Int. Cl.
| | |
|---|---|
| *G01J 3/28* | (2006.01) |
| *G01J 3/02* | (2006.01) |
| *G01J 3/44* | (2006.01) |
| *G02B 6/12* | (2006.01) |
| *G02B 6/122* | (2006.01) |
| *G02B 6/42* | (2006.01) |
| *G01J 3/12* | (2006.01) |
| *G01J 3/18* | (2006.01) |

(52) U.S. Cl.
CPC .......... *G01J 3/0218* (2013.01); *G01J 3/0205* (2013.01); *G01J 3/0243* (2013.01); *G01J 3/0256* (2013.01); *G01J 3/12* (2013.01); *G01J 3/44* (2013.01); *G02B 6/12014* (2013.01); *G02B 6/1228* (2013.01); *G02B 6/429* (2013.01); *G01J 3/1895* (2013.01)

(58) Field of Classification Search
CPC .... G01J 3/02; G01J 3/28; G01J 3/2803; G01J 3/10; G01J 3/2823
USPC ........................................ 356/326
See application file for complete search history.

(56) References Cited

U.S. PATENT DOCUMENTS

| | | | |
|---|---|---|---|
| 4,812,641 A * | 3/1989 | Ortiz, Jr. ................ | G01M 11/35 219/121.62 |
| 5,682,401 A | 10/1997 | Joannopoulos et al. | |
| 5,719,667 A * | 2/1998 | Miers .................. | G01N 15/1436 356/338 |
| 7,197,196 B2 | 3/2007 | Lin et al. | |
| 7,603,016 B1 | 10/2009 | Soref | |
| 2006/0139655 A1 | 6/2006 | Tixier | |
| 2007/0081156 A1 | 4/2007 | Treado et al. | |
| 2013/0036796 A1 * | 2/2013 | Fleury, Jr. ............... | E03B 7/071 73/40.5 R |
| 2016/0356665 A1 * | 12/2016 | Felemban ........... | G01M 3/2807 |

(Continued)

FOREIGN PATENT DOCUMENTS

CN           204229006 U         3/2015

*Primary Examiner* — Md M Rahman
(74) *Attorney, Agent, or Firm* — Sughrue Mion, PLLC

(57) ABSTRACT

A leaky waveguide includes a waveguide configured to propagate light; a defect structure provided on a portion of the waveguide and configured to cause the light propagating in the waveguide to leak outside of the waveguide; and a plurality of detectors provided at predetermined positions adjacent to the defect structure and configured to detect the light leaking from the defect structure. Accordingly, a spectroscope including the leaky waveguide may have a reduced size.

16 Claims, 11 Drawing Sheets

(56) References Cited

U.S. PATENT DOCUMENTS

| | | |
|---|---|---|
| 2017/0135582 A1* | 5/2017 | Cho ............... A61B 5/0075 |
| 2017/0261738 A1* | 9/2017 | Shiono ............ G02B 21/0056 |
| 2017/0311775 A1* | 11/2017 | Fujita ............. A61B 1/00013 |
| 2017/0374295 A1* | 12/2017 | Topfer ............. H04N 5/32 |
| 2018/0017881 A1* | 1/2018 | Van Der Schaar ............... G03F 7/70633 |
| 2018/0080851 A1* | 3/2018 | Medower ........... G01M 11/33 |
| 2018/0196205 A1* | 7/2018 | Song ............... G02B 6/42 |

* cited by examiner

LEAKY WAVEGUIDE, SPECTROSCOPIC METHOD, AND SPECTROSCOPE INCLUDING THE LEAKY WAVEGUIDE

CROSS-REFERENCE TO RELATED APPLICATION

This application claims the priority from Korean Patent Application No. 10-2017-0168480, filed on Dec. 8, 2017 in the Korean Intellectual Property Office, the disclosure of which is incorporated herein in its entirety by reference.

BACKGROUND

1. Field

Example embodiments of the present disclosure relate to a spectroscope and a spectroscopic method.

2. Description of the Related Art

Examples of spectroscopes that analyze information about the wavelength of light include a prism spectroscope using a refractive index difference between light wavelengths, a diffraction grating spectroscope using diffraction and interference of light, a Fourier transform spectroscope using interference of light, and Fabry-Perot interferometer. The Fourier transform spectroscope requires additional components such as a moving mirror, and the diffraction grating spectroscope requires additional equipment to guide light from a light source to a grating. Due to these reasons, there is a limit to reducing the size of existing spectroscopes.

As such, there is a need to develop smaller spectroscopes to improve the portability and usefulness of the spectroscopes and optical devices including the spectroscopes.

SUMMARY

One or more example embodiments provide a spectroscope including a leaky waveguide and a spectroscopic method.

According to an aspect of an example embodiment, there is provided a leaky waveguide including a waveguide configured to propagate light, a defect structure provided on a portion of the waveguide and configured to cause the light propagating in the waveguide to leak outside of the waveguide, and a plurality of detectors provided at predetermined positions adjacent to the defect structure and configured to detect the light leaking from the defect structure.

The defect structure may be configured in a shape to break total internal reflection conditions of the light propagating in the waveguide which is being totally internally reflected.

The predetermined positions may be positions at which the light leaking from the defect structure are combined by interference.

The plurality of detectors may include a first detector provided at a first position and a second detector provided at a second position, wherein light combined by interference at the first and second positions are in different wavelength bands.

The plurality of detectors may include a first detector provided at a first position and a second detector provided at a second position, wherein light propagating to the first and second positions has different wavelength distributions.

The defect structure may include at least one groove on a surface of the waveguide.

The at least one groove may include a concave-convex pattern.

The defect structure may include a penetration hole penetrating the waveguide in a direction crossing a direction of the light propagating in the waveguide.

The defect structure may include a plurality of penetration holes at regular intervals.

The cross-sections of the plurality of penetration holes taken in a direction perpendicular to the direction crossing the direction of the light propagating in the waveguide may be configured in at least one from among a circular, elliptical, or polygonal shape.

The penetration hole may be filled with a material having a refractive index different from a refractive index of the waveguide.

According to an aspect of an example embodiment, there is provided a spectroscopic method including splitting analysis-target light along a plurality of paths, the analysis-target light comprising different wavelength distributions, detecting the split analysis-target light using a plurality of detectors respectively provided at predetermined positions in portions of the plurality of paths, and reconstructing a wavelength spectrum of the analysis-target light based on information corresponding to amount of the split analysis-target light detected by the plurality of detectors and the wavelength distributions corresponding to the plurality of paths.

The splitting of the analysis-target light may be performed using a waveguide comprising a defect structure configured to cause leakage of light.

The spectroscopic method may further include setting predetermined positions of the plurality of detectors based on a material of the waveguide and a shape of the defect structure.

According to an aspect of an example embodiment, there is provided a spectroscope including a waveguide configured to propagate light, a defect structure provided on a portion of the waveguide and configured to cause the light propagating in the waveguide to leak outside of the waveguide, a plurality of detectors provided at predetermined positions adjacent to the defect structure and configured to detect the light leaking from the defect structure, and a calculator configured to perform a calculation to reconstruct a wavelength spectrum of the light incident on the waveguide based on amounts of the light leaking from the defect structure detected by the plurality of detectors.

The defect structure may be configured in a shape to break total internal reflection conditions of the light propagating in the waveguide which is being totally internally reflected.

The spectroscope may further include a memory storing wavelength distributions at the predetermined positions, the wavelength distributions being determined based on a material of the waveguide and a shape of the defect structure.

The defect structure may include a groove on a surface of the waveguide.

The defect structure may include a penetration hole penetrating the waveguide in a direction crossing a direction of the light propagating in the waveguide.

According to an aspect of an example embodiment, there is provided an optical device including a light source configured to emit light to a target object, the spectroscope placed in a path along which the light emitted to the target object from the light source scatters and propagates from the target object, and a processor configured to analyze physical properties of the target object by analyzing light detected by the spectroscope.

BRIEF DESCRIPTION OF THE DRAWINGS

The and/or other aspects will become apparent and more readily appreciated from the following description of the example embodiments, taken in conjunction with the accompanying drawings in which.

DETAILED DESCRIPTION

Figure 1:
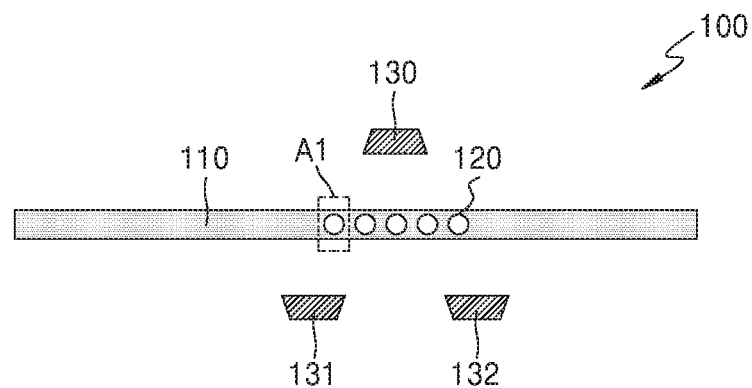
FIG. 1 is a cross-sectional view illustrating a structure of a leaky waveguide according to an example embodiment.

Reference will now be made in detail to example embodiments, examples of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects.

As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

In the drawings, like reference numerals refer to like elements, and the size of each element may be exaggerated for clarity of illustration. The spectroscopes including the leaky waveguides may be implemented in different shapes and are not limited to example embodiments described below.

In the present disclosure, it will be further understood that the terms "comprises" and/or "comprising" used herein specify the presence of stated features or elements, but do not preclude the presence or addition of one or more other features or elements.

FIG. 1 is a cross-sectional view illustrating a structure of a leaky waveguide 100 according to an example embodiment.

Referring to FIG. 1, the leaky waveguide 100 may include a waveguide 110 providing a light propagation path, penetration holes 120 provided in a region of the waveguide 110 as defect structures, and a plurality of detectors 130 to 132, for example, first to third detectors 130, 131, and 132, adjacent to the penetration holes 120.

The waveguide 110 may include a material having a refractive index greater than that of a surrounding material, for example, air, and light incident inside the wave guide 110 may propagate in the waveguide 110 by total internal reflection (TIR) occurring at an interface between the waveguide 110 and the surrounding material.

The penetration holes 120 break TIR conditions under which light propagates in the waveguide 110, and thus, some of light propagating in the waveguide 110 and incident on the interface of the waveguide 110 may leak to the outside of the waveguide 110. Paths through which light leaks may vary with the shape of the penetration holes 120, the material of the waveguide 110, and the wavelength of the light. For example, since the refractive index of the waveguide 110 varying according to the material of the waveguide 110 also varies according to the wavelength of light, the path of light leaking through a same penetration hole 120 varies based on the wavelength of the light. As described above, light leaking according to the material of the waveguide 110 and characteristics of the penetration holes 120, such as shapes, sizes, positions, etc., may have a path which varies based on the wavelength of the light.

The detectors 130 to 132 may be provided at particular positions. The particular positions may be positions at which light leaking through the penetration holes 120 are combined by interference between wavelengths. Wavelength distributions of light to be observed at the particular positions may be accurately calculated through computing by considering the material of the waveguide 110 and characteristics of the penetration holes 120, such as shapes, sizes, positions, etc. The detectors 130 to 132 may be provided at the particular positions at which the wavelength distributions obtained by calculation may be detected, and the spectrum of incident light may be reconstructed using the wavelength distributions. The detectors 130 to 132 may measure amounts of light leaking through the penetration holes 120.

Each of the wavelength distribution may indicate a ratio of wavelengths of light measured by each of the detectors 130 to 132. For example, the distribution of each of single-wavelength light beams having different wavelengths $\lambda 1$, $\lambda 2$, and $\lambda 3$ may be different in the first to third detectors 130 to 132. An example wavelength distribution may be as follows. The amount of light measured by the first detector 130 may include 20% $\lambda 1$, 30% $\lambda 2$, and 50% $\lambda 3$. The amount of light measured by the second detector 131 may include 50% $\lambda 1$, 40% $\lambda 2$, and 10% $\lambda 3$. The amount of light measured by the third detector 132 may include 60% $\lambda 1$, 20% $\lambda 2$, and 20% $\lambda 3$. The spectrum of incident light may be reconstructed based on information about the amount and wavelength distribution of light measured by each of the detectors 130 to 132.

Figure 2:
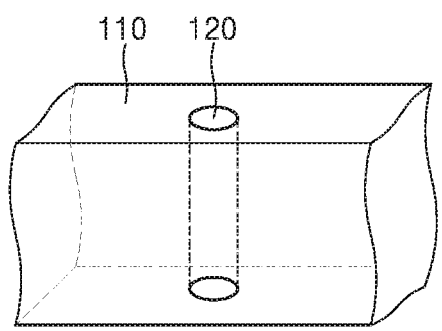
FIG. 2 is an enlarged perspective view illustrating a portion A1 of FIG. 1.

FIG. 2 is an enlarged perspective view illustrating a portion A1 of FIG. 1.

Referring to FIG. 2, a defect structure provided in a region of the waveguide 110 may be a penetration hole 120 formed in a direction crossing a propagation direction OP in which incident light propagates in the waveguide 110.

Since the penetration hole 120 is formed at a middle position in the propagation direction OP of light, the penetration hole 120 may obstruct the propagation of light. Light obstructed from propagating may be scattered by a defect structure such as the penetration hole 120, and may leak to the outside of the waveguide 110.

The cross-sectional size of the penetration hole 120 may be equal to or less than the width (w) of the waveguide 110. Although the waveguide 110 is illustrated as having a rectangular parallelepiped shape, the waveguide 110 is not limited thereto. For example, the waveguide 110 may have a cylindrical shape. Although the waveguide 110 is illustrated as having a single-layer structure, the waveguide 110 is not limited thereto. For example, the waveguide 110 may include a core and a cladding layer surrounding the core.

Figure 3:
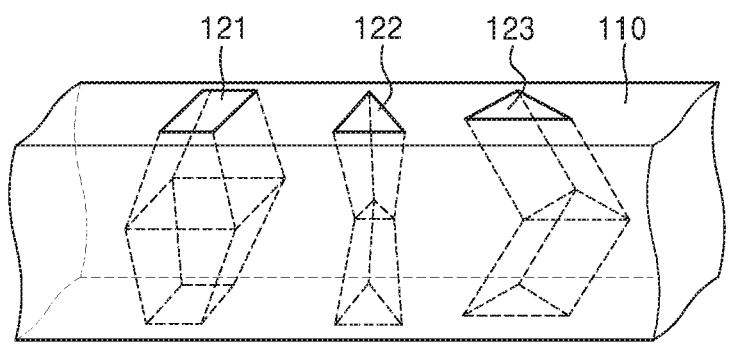
FIG. 3 is a perspective view illustrating example penetration holes having various shapes that are applicable to the leaky waveguide shown in FIG. 1.

FIG. 3 is a perspective view illustrating example penetration holes 121, 122, and 123, such as first to third penetration holes 121 to 123, having various shapes that are applicable to the leaky waveguide 100 shown in FIG. 1.

Referring to FIG. 3, polygonal cross-sectional shapes are illustrated. However, example embodiment are not limited thereto. For example, cross-sections having curved lines such as a circular or elliptical cross-section may be employed. The penetration holes 121 to 123 penetrate the waveguide 110 in a direction crossing the propagation direction OP of incident light.

In this case, the size or shape of a cross section of the penetration holes 121 to 123 taken in a direction perpendicular to the crossing direction may not be constant. In other words, paths through which the penetration holes 121 to 123 penetrate the waveguide 110 may not be constant. The first penetration hole 121 may have a tetragonal cross-section. The width of the first penetration hole 121 may gradually increase to a certain position, and may then decrease in a direction in which the first penetration hole 121 penetrates the waveguide 110. The second penetration hole 122 may have a triangular cross-section. The width of the second penetration hole 122 may gradually decrease to a certain position, and may then increase in a direction in which the second penetration hole 122 penetrates the waveguide 110. The third penetration hole 123 may have a triangular cross-section. The direction the third penetration hole 123 penetrates the waveguide 110 may vary at a certain position as the third penetration hole 123 penetrates the waveguide 110.

Figure 4:
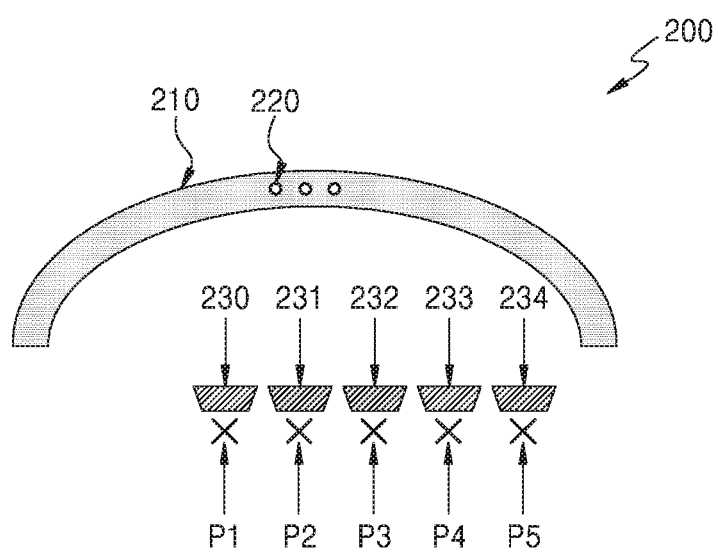
FIG. 4 is a cross-sectional view illustrating a leaky waveguide according to an example embodiment.

FIG. 4 is a cross-sectional view illustrating a leaky waveguide 200 according to an example embodiment.

Referring to FIG. 4, the leaky waveguide 200 includes a curved waveguide 210, a plurality of penetration holes 220 formed in a region of the waveguide 210, and a plurality of detectors 230, 231, 232, 233, and 234 such as first to fifth detectors 230 to 234.

The detectors 230 to 234 may be arranged at particular positions P1, P2, P3, P4, and P5 such as first to fifth positions P1 to P5 that are previously calculated as positions at which light leaking through the penetration holes 220 are combined by interference between different wavelengths of light.

FIGS. 5 to 9 are graphs illustrating the amounts of light respectively measured by the detectors 230 to 234 arranged at the first to fifth positions P1 to P5.

Figure 5:
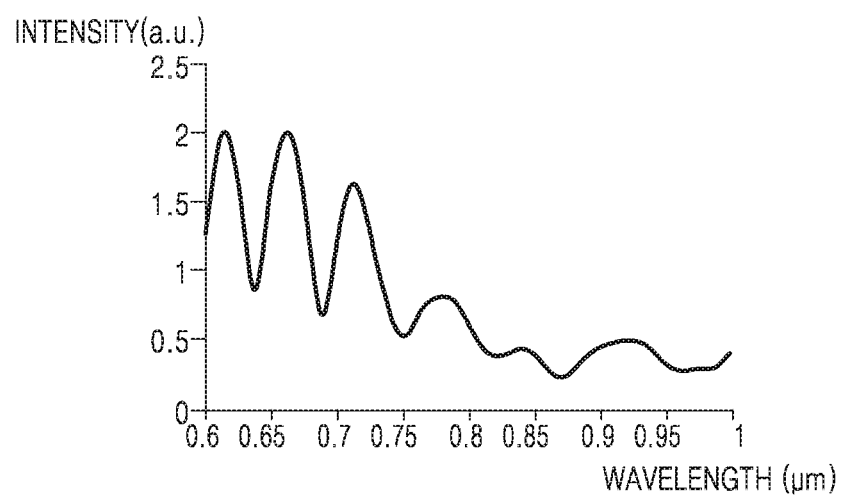
FIGS. 5 to 9 are graphs illustrating amounts of light respectively measured by detectors arranged at first to fifth positions shown in FIG. 4.

Referring to FIG. 5, the amount of light measured by the first detector 230 provided at the first position P1 is relatively large at wavelengths such as about 0.62 μm, about 0.67 μm, and about 0.72 μm, and is relatively small at wavelengths such as about 0.75 μm, about 0.85 μm, and about 0.95 μm.

Figure 6:
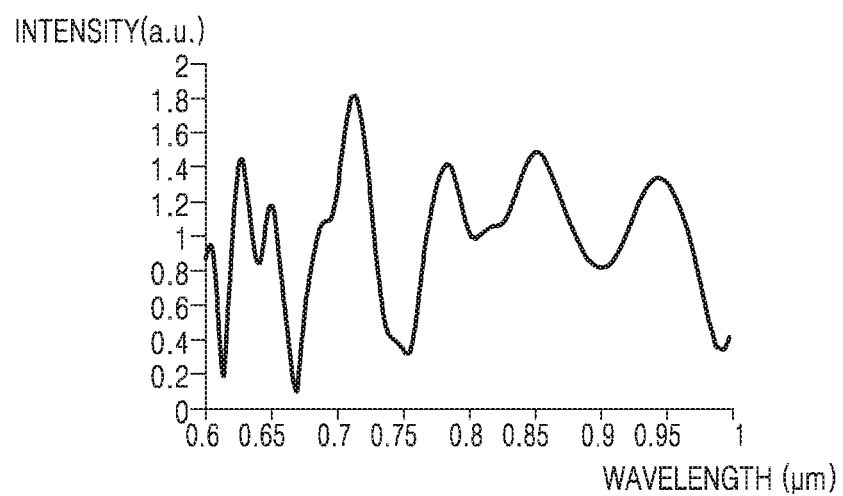

Referring to FIG. 6, the amount of light measured by the second detector 231 provided at the second position P2 is relatively large at wavelengths such as about 0.63 μm, about 0.72 μm, and about 0.85 μm, and is relatively small at wavelengths such as about 0.62 μm, about 0.67 μm, and about 0.75 μm.

Figure 7:
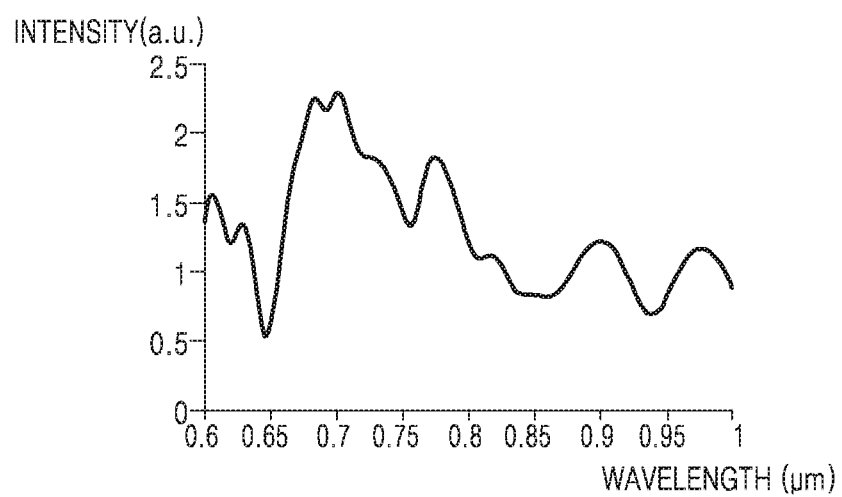

Referring to FIG. 7, the amount of light measured by the third detector 232 provided at the third position P3 is relatively large at wavelengths such as about 0.68 μm, about 0.70 μm, and about 0.77 μm, and is relatively small at wavelengths such as about 0.65 μm, about 0.85 μm, and about 0.94 μm.

Figure 8:
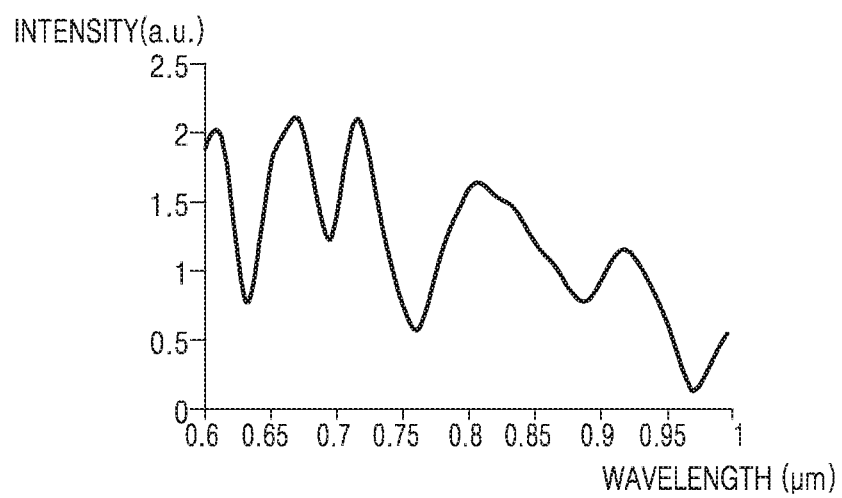

Referring to FIG. 8, the amount of light measured by the fourth detector 233 provided at the fourth position P4 is relatively large at wavelengths such as about 0.62 μm, about 0.67 μm, about 0.72 μm, and about 0.82 μm, and is relatively small at wavelengths such as about 0.64 μm, about 0.77 μm, and about 0.97 μm.

Figure 9:
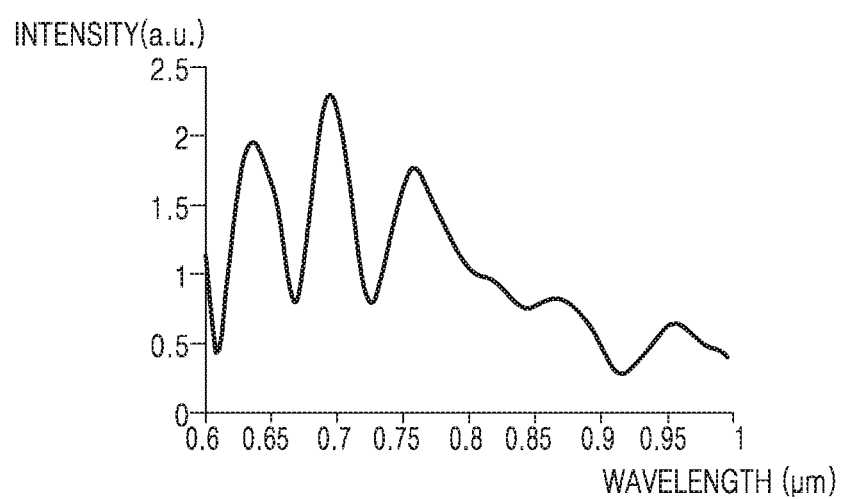

Referring to FIG. 9, the amount of light measured by the fifth detector 234 provided at the fifth position P5 is relatively large at wavelengths such about 0.64 μm, about 0.69 μm, and about 0.76 μm, and is relatively small at wavelengths such as about 0.62 μm, about 0.85 μm, and about 0.92 μm.

As described above, light combined at the particular positions P1 to P5 of the detectors 230 to 234 may have different wavelength distributions. The wavelength distribution at each of the positions P1 to P5 may be previously calculated by computing before arranging the detectors 230 to 234. The detectors 230 to 234 may measure the amounts of light at the positions P1 to P5. The spectrum of original light incident on the leaky waveguide 200 may be reconstructed based on the measured amounts of light and predicted wavelength distributions at the positions P1 to P5.

Figure 10:
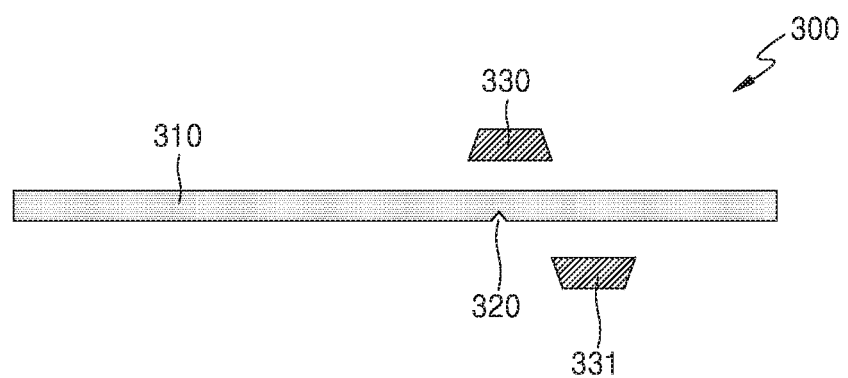
FIG. 10 is a cross-sectional view illustrating a leaky waveguide according to an example embodiment.

FIG. 10 is a cross-sectional view illustrating a leaky waveguide 300 according to an example embodiment.

Referring to FIG. 10, a defect structure provided on a surface of a waveguide 310 may be at least one groove 320. The groove 320 may be formed in a triangular shape in a region of the waveguide 310. However, the shape of the groove 320 is not limited thereto. The groove 320 may have various shapes such as a polygon, a semicircle, an ellipse, a cone, a cylinder, or a triangle or higher polygon pyramid.

Since the groove 320 is formed at a middle position in a propagation direction of light, the groove 320 may obstruct the propagation of light. Light obstructed in propagating may scatter at the groove 320 and may leak to the outside of the waveguide 310. Light measured by a plurality of detectors 330 and 331 may have different wavelength distributions.

Figure 11:
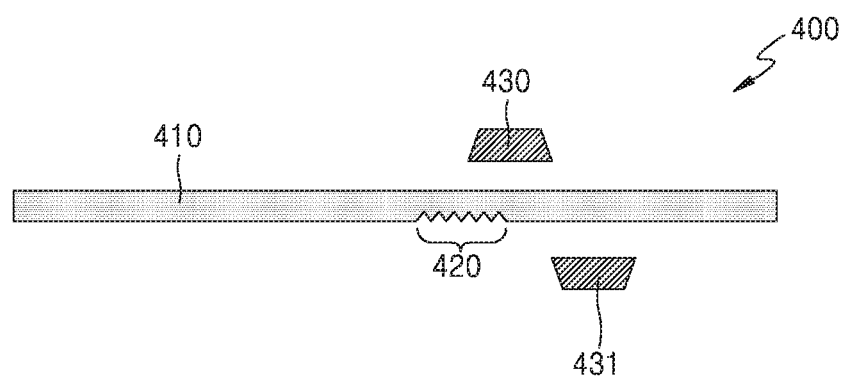
FIG. 11 is a cross-sectional view illustrating a leaky waveguide according to an example embodiment.

FIG. 11 is a cross-sectional view illustrating a leaky waveguide 400 according to an example embodiment.

Referring to FIG. 11, a defect structure provided on a surface of a waveguide 410 may be a concave-convex pattern in which a plurality of grooves are arranged at regular intervals. The concave-convex pattern may have various shapes according to the shape of the grooves. For example, the concave-convex pattern may be a triangular concave-convex pattern 420 having a plurality of triangular grooves formed in the waveguide 410. The concave-convex pattern may have various shapes according to the shape of the grooves and is not limited to the example shape shown in FIG. 11.

Since the triangular concave-convex pattern 420 is provided in a middle position in a propagation direction of light, the triangular concave-convex pattern 420 may obstruct the propagation of light. Light obstructed in propagating may scatter at the triangular concave-convex pattern 420 and may leak to the outside of the waveguide 410. Light measured by a plurality of detectors 430 and 431 may have different wavelength distributions.

Figure 12:
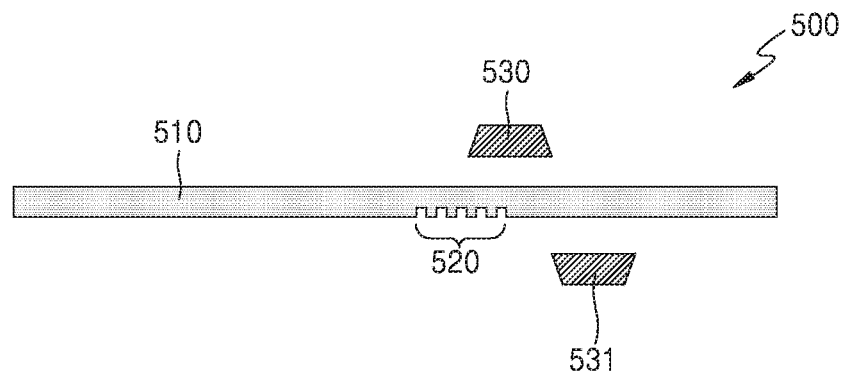
FIG. 12 is a cross-sectional view illustrating a leaky waveguide according to an example embodiment.

FIG. 12 is a cross-sectional view illustrating a leaky waveguide 500 according to an example embodiment.

Referring to FIG. 12, a defect structure provided on a surface of a waveguide 510 may be a concave-convex pattern in which a plurality of grooves are arranged at regular intervals. The concave-convex pattern may have various shapes according to the shape of the grooves. For example, the concave-convex pattern may be a tetragonal concave-convex pattern 520 having a plurality of tetragonal grooves formed in the waveguide 510. The concave-convex pattern may have various shapes according to the shape of the grooves and is not limited to the example shape shown in FIG. 12.

Since the tetragonal concave-convex pattern 520 is provided in a middle position in a propagation direction of light, the tetragonal concave-convex pattern 520 may obstruct the propagation of light. Light obstructed in propagating may scatter at the tetragonal concave-convex pattern 520 and may leak to the outside of the waveguide 510. Light measured by a plurality of detectors 530 and 531 may have different wavelength distributions.

Figure 13:
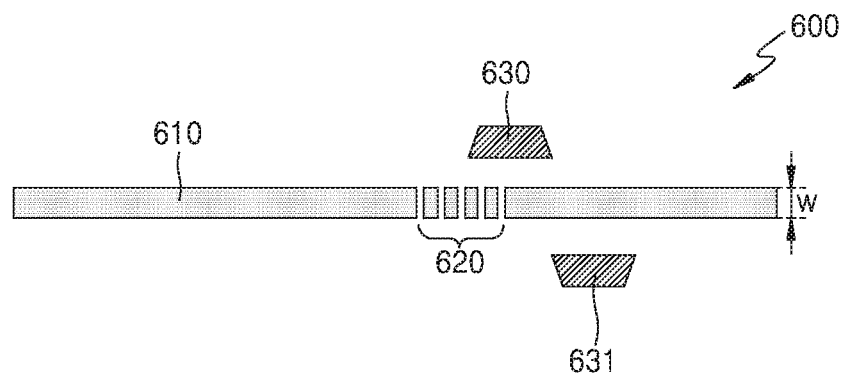
FIG. 13 is a cross-sectional view illustrating a leaky waveguide according to an example embodiment.

FIG. 13 is a cross-sectional view illustrating a leaky waveguide 600 according to an example embodiment.

Referring to FIG. 13, penetration holes 620 having a tetragonal sectional shape and the same width (w) as that of a waveguide 610 may be formed as defect structures. In this case, the waveguide 610 may be cut at the penetration holes 620. Since the lengths of the penetration holes 620 are very short compared to the length of the waveguide 610 in a propagation direction of light, most light may propagate in the waveguide 610, but some light may scatter and leak to the outside at positions around the penetration holes 620 because of breakage of TIR conditions. Light measured by a plurality of detectors 630 and 631 may have different wavelength distributions.

Figure 14:
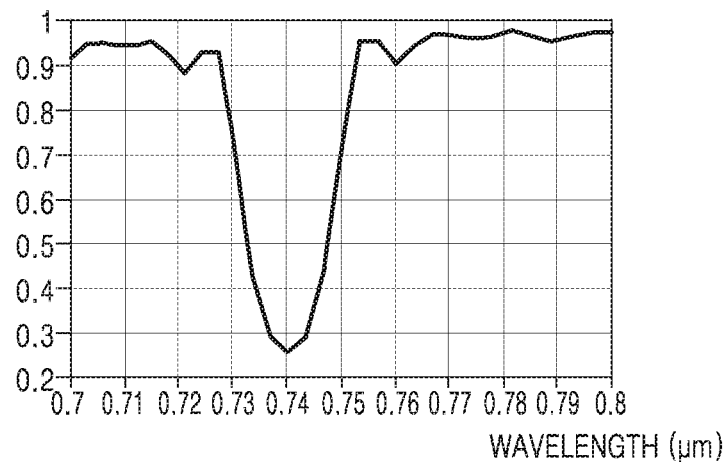
FIGS. 14 to 16 are graphs illustrating spectra of light propagating in a waveguide after some of the light leaks in cases in which the length of penetration holes of the leaky waveguide shown in FIG. 13 is 10 nm, 20 nm, and 30 nm, respectively.
Figure 15:
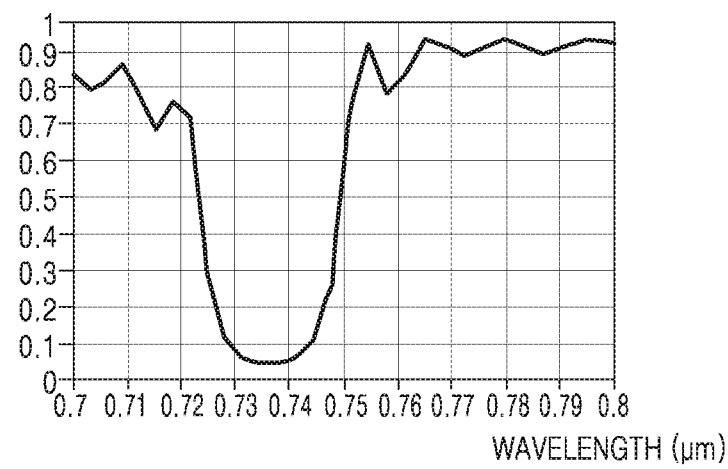
Figure 16:
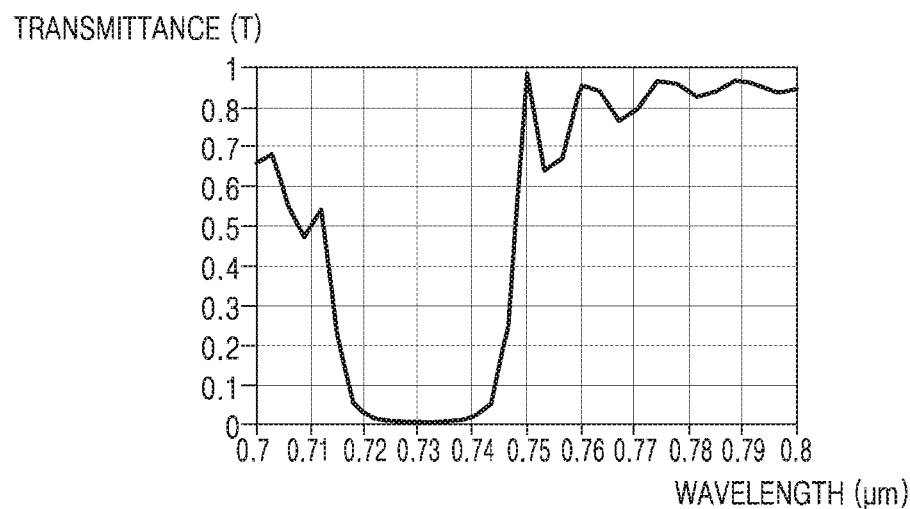

FIGS. 14 to 16 are graphs illustrating spectra of light propagating in the waveguide 610 of FIG. 13 after some of the light leaks for examples in which the length of the penetration holes 620 are 10 nm, 20 nm, and 30 nm.

Referring to FIG. 14, when the length of the penetration holes 620 is 10 nm, the spectrum of incident light shows that the transmittance of light may be the lowest at a wavelength of 740 nm after some of the light leaks through the penetration holes 620. That is, when the length of the penetration holes 620 is 10 nm, light may leak the most at a wavelength of 740 nm through the penetration holes 620.

Referring to FIG. 15, when the length of the penetration holes 620 is 20 nm, the spectrum of incident light shows that the transmittance of light may be the lowest at a wavelength of 736 nm after some of the light leaks through the penetration holes 620. That is, when the length of the penetration holes 620 is 20 nm, light may leak the most at a wavelength of 736 nm through the penetration holes 620.

Referring to FIG. 16, when the length of the penetration holes 620 is 30 nm, the spectrum of incident light shows that the transmittance of light may be the lowest at a wavelength of 730 nm after some of the light leaks through the penetration holes 620. That is, when the length of the penetration holes 620 is 30 nm, light may leak the most at a wavelength of 730 nm through the penetration holes 620.

As described above, the wavelength at which light mainly leaks through the penetration holes 620 may vary with the length of the penetration holes 620.

Figure 17:
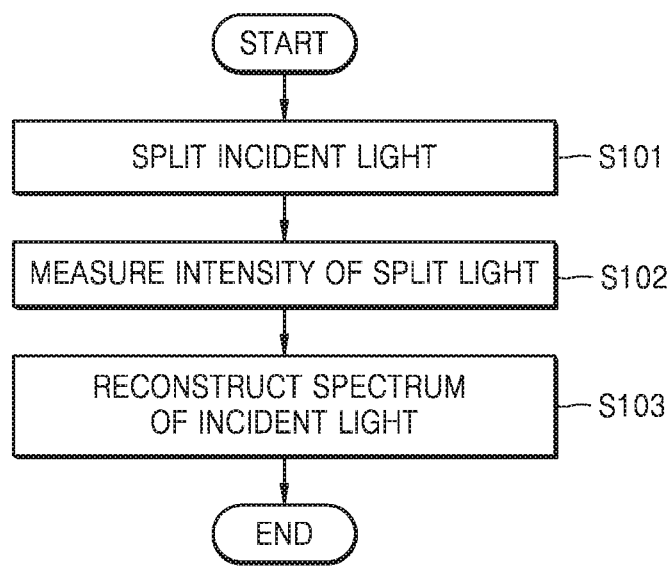
FIG. 17 is a flowchart illustrating a spectroscopic method according to an example embodiment.

FIG. 17 is a flowchart illustrating a spectroscopic method according to an example embodiment.

In S101, light to be analyzed may be split along a plurality of paths in which the light has different wavelength distributions. For example, a leaky waveguide 1100 having a defect structure causing leakage of light as shown in FIG. 18 may be used to split light.

In S102, a plurality of detectors provided at particular positions at which split light are combined by interference may measure the amounts of light combined at the particular positions.

In S103, spectra of leaking light may be obtained by considering the amounts of light measured in S102 and wavelength distributions calculated to determine the positions of the detectors. The spectrum of incident light may be reconstructed based on the spectra of leaking light respectively obtained using the detectors.

Figure 18:
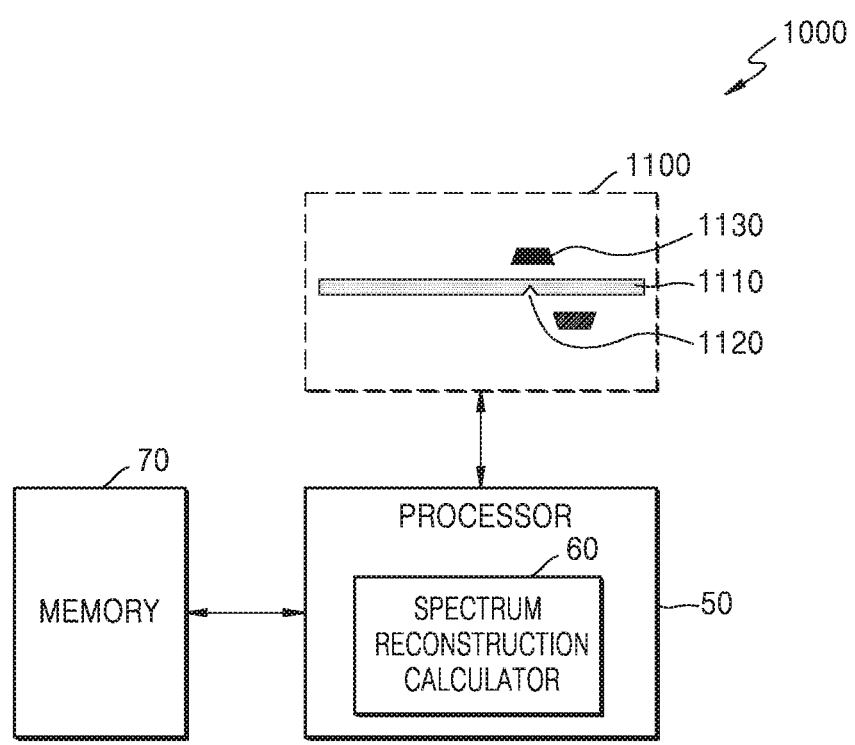
FIG. 18 is a block diagram schematically illustrating a structure of a spectroscope according to an example embodiment.

FIG. 18 is a view schematically illustrating a structure of a spectroscope 1000 according to an example embodiment.

Referring to FIG. 18, the spectroscope 1000 may include a waveguide 1110 providing a propagation path for incident light, a defect structure 1120 provided on a portion of the waveguide 1110 to cause leakage of light, a plurality of detectors 1130 provided at particular positions around the defect structure 1120 to detect light leaking from the defect structure 1120, and a calculator 60 configured to reconstruct the wavelength spectrum of the incident light based on information about light amounts detected by the detectors 1130. The spectroscope 1000 may further include a memory 70 storing wavelength distributions at the particular positions which are determined according to the material of the waveguide 1110 and the shape of the defect structure 1120.

In the memory 70, previously calculated wavelength distributions of light combined at the particular positions may be stored. Wavelength distribution may be a ratio of wavelengths of light measured by each of the detectors 1130.

The calculator 60 may be included in a processor 50 communicating with the memory 70. The communication may include communication for transmitting and receiving programs stored in the memory 70 for operation of the processor 50 or data necessary for performing functions of the processor 50. The processor 50 may cause the calculator 60 to perform a calculation for reconstructing the spectrum of incident light.

Figure 19:
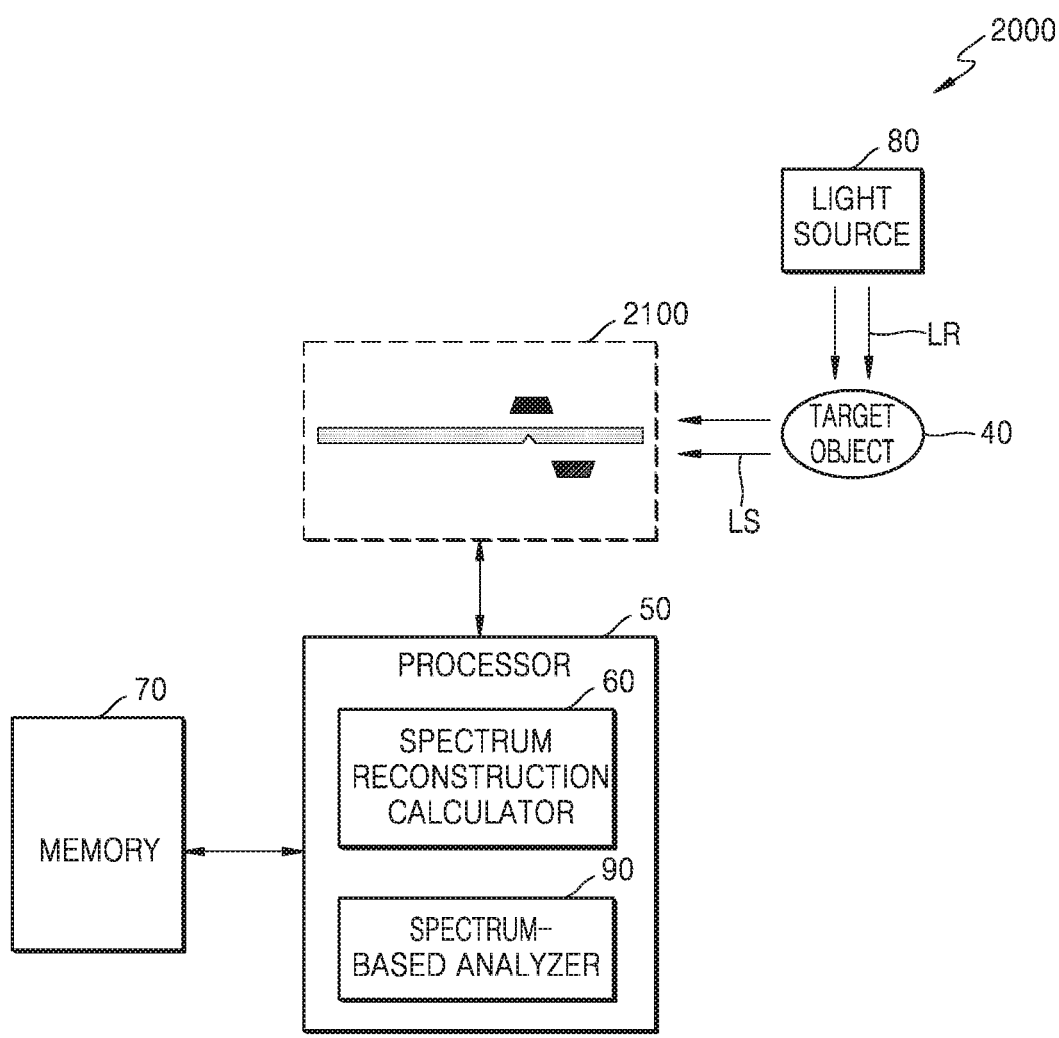
FIG. 19 is a block diagram schematically illustrating a structure of an optical device according to an example embodiment.

FIG. 19 is a block diagram schematically illustrating a structure of an optical device 2000 according to an example embodiment.

Referring to FIG. 19, the optical device 2000 may include a light source 80 configured to emit light to a target object 40 to be inspected, a spectroscope equal to the spectroscope 1000 shown in FIG. 18 and placed in a path along which the light emitted to the target object 40 scatters from the target object 40, and an analyzer 90 configured to analyze light detected by the spectroscope 1000 for analyzing physical properties of the target object 40.

The target object 40 is an object to be analyzed, such as a body part making contact with or adjacent to the optical device 2000. For example, the target object 40 may be a body part from which blood glucose is easily measured. In addition, the target object 40 may be a food of which the freshness is to be measured. In addition, the target object 40 may be any other object of which physical properties are to be analyzed.

The spectroscope 1000 may reconstruct the spectrum of light scattering from the target object 40 by the above-described spectroscopic method. A processor 50 may cause the analyzer 90 to analyze physical properties of the target object 40 using the reconstructed spectrum.

For example, the analyzer 90 may analyze physical properties of the target object 40 using a Raman analysis method. Light LR emitted to the target object 40 is scattered by various molecules included in the target object 40, and some of the scattered light is Raman shifted. The Raman-shifted light includes vibrational spectroscopic information unique to each molecule species, and thus, components of the target object 40 may be identified based on the information.

The optical device 2000 may be a device for checking the state of foods. In this case, the light source 80 may emit light to a food, and the spectroscope 1000 placed at a particular position in a path along which the light emitted to the food scatters may reconstruct the spectrum of the scattering light. The analyzer 90 may check the state of the food by comparing wavelengths of the scattering light with wavelengths of incident light by using the reconstructed spectrum.

As described above, according to the one or more of the above example embodiments, a small spectroscope may be provided by forming a defect structure on a waveguide to cause leakage of light from the waveguide. The spectroscope configured to measure characteristics of light may be used for improving the portability and usefulness of various electronic devices having more convenient functions such as such as skin state analysis, food state analysis, or blood glucose measurement.

The leaky waveguide, the spectroscope including the leaky waveguide, and the optical device including the leaky waveguide have been described with reference to the accompanying drawings according to the example embodiments for illustrative purposes only, and it will be understood by those of ordinary skill in the art that various changes and other equivalent embodiments may be made therefrom. Therefore, the scope and spirit of the inventive concept should be defined by the following claims.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A leaky waveguide comprising:
   a waveguide configured to propagate light;
   a defect structure provided on a portion of the waveguide and configured to cause the light propagating in the waveguide to leak outside of the waveguide; and
   a plurality of detectors provided at predetermined positions adjacent to the defect structure and configured to detect the light leaking from the defect structure,
   wherein the predetermined positions are positions at which the light leaking from the defect structure are combined by interference.

2. The leaky waveguide of claim 1, wherein the defect structure is configured in a shape to break total internal reflection conditions of the light propagating in the waveguide which is being totally internally reflected.

3. The leaky waveguide of claim 1, wherein the plurality of detectors comprise a first detector provided at a first position and a second detector provided at a second position, wherein light combined by interference at the first and second positions are in different wavelength bands.

4. The leaky waveguide of claim 1, wherein the plurality of detectors comprise a first detector provided at a first position and a second detector provided at a second position, wherein light propagating to the first and second positions has different wavelength distributions.

5. The leaky waveguide of claim 1, wherein the defect structure comprises at least one groove on a surface of the waveguide.

6. The leaky waveguide of claim 5, wherein the at least one groove comprises a concave-convex pattern.

7. The leaky waveguide of claim 1, wherein the defect structure comprises a penetration hole penetrating the waveguide in a direction crossing a direction of the light propagating in the waveguide.

8. The leaky waveguide of claim 7, wherein the defect structure comprises a plurality of penetration holes at regular intervals.

9. The leaky waveguide of claim 8, wherein cross-sections of the plurality of penetration holes taken in a direction perpendicular to the direction crossing the direction of the light propagating in the waveguide are configured in at least one from among a circular, elliptical, or polygonal shape.

10. The leaky waveguide of claim 7, wherein the penetration hole is filled with a material having a refractive index different from a refractive index of the waveguide.

11. A spectroscope comprising:
    a waveguide configured to propagate light;
    a defect structure provided on a portion of the waveguide and configured to cause the light propagating in the waveguide to leak outside of the waveguide;
    a plurality of detectors provided at predetermined positions adjacent to the defect structure and configured to detect the light leaking from the defect structure; and
    a calculator configured to perform a calculation to reconstruct a wavelength spectrum of the light incident on the waveguide based on amounts of the light leaking from the defect structure detected by the plurality of detectors,
    wherein the predetermined positions are positions at which the light leaking from the defect structure are combined by interference.

12. The spectroscope of claim 11, wherein the defect structure is configured in a shape to break total internal reflection conditions of the light propagating in the waveguide which is being totally internally reflected.

13. The spectroscope of claim 11, further comprising:
    a memory storing wavelength distributions at the predetermined positions, the wavelength distributions being determined based on a material of the waveguide and a shape of the defect structure.

14. The spectroscope of claim 11, wherein the defect structure comprises a groove on a surface of the waveguide.

15. The spectroscope of claim 11, wherein the defect structure comprises a penetration hole penetrating the waveguide in a direction crossing a direction of the light propagating in the waveguide.

16. An optical device comprising:
    a light source configured to emit light to a target object;

the spectroscope of claim 11 placed in a path along which the light emitted to the target object from the light source scatters and propagates from the target object; and a processor configured to analyze physical properties of the target object by analyzing light detected by the spectroscope.

\* \* \* \* \*